United States Patent Office 3,297,086
Patented Jan. 10, 1967

3,297,086
SAND CONSOLIDATION METHOD
Horace H. Spain, Houston, Tex., assignor, by mesne assignments, to Esso Production Research Company, Houston, Tex., a corporation of Delaware
No Drawing. Filed Mar. 30, 1962, Ser. No. 183,751
15 Claims. (Cl. 166—33)

This invention concerns a method for consolidating the sands of loose or incompetent formations penetrated by a borehole, and in particular concerns a method for consolidating the sands of subsurface formations by injecting into the formations thermosetting plastics or resins which set and bind the sand particles of the formations together. Specifically, the invention relates to an improved sand consolidation in which a silane preflush solution is injected into the formations to be consolidated prior to introduction of the thermosetting plastics. Another aspect of the invention resides in the use of critical catalyst proportions to achieve higher plastic consolidated sand compressive strengths.

A primary object of the present invention is to provide better methods of sand consolidation that are economical, rapid acting, and generally applicable to various types of formations. The techniques to be described overcome disadvantages inherent in similar sand consolidating procedures.

Many oil and gas reservoirs consist of loose unconsolidated sands. Production of these petroleum fluids from such formations is made difficult because the sand flows into the well bore along with the petroleum fluids being produced and causes damage to surface and subsurface equipment; also it may fill the well bore to the extent that little or no flow of production fluids is obtained from the well. Consequently, it is necessary to restrain or prevent in some manner the reservoir sands from entering the well bore. One method for inhibiting or preventing the flow of sand from unconsolidated formations which has proved successful in many instances is the introduction of a thermosetting resin into the sands. The resin is deposited in the reservoir in a manner such that the sand grains bond together and the sand body remains permeable to the flow of petroleum production fluids.

Particularly good consolidating resins of this type utilize the resin-forming properties of the reaction between a water-soluble aldehyde and a low molecular weight hydroxy aryl compound catalyzed by an alkaline or acidic catalyst. When these compounds are introduced into an unconsolidated sand formation, a resin forms which cements the particles of the formation together. Although any water-soluble aldehyde may be used, formaldehyde, acetaldehyde, propionaldehyde, or mixtures thereof are preferred. The low molecular weight hydroxy aryl compound may include phenol, cresol, beta naphthol, resorcinol, or cresylic acid, or mixture thereof; and for low temperature formations, xylenols, especially 1,3,5-xylenol (dimethyl phenol) is preferred. Suitable acidic catalysts which may be used include acidic salts, such as stannous chloride or magnesium chloride; mineral acids, such as hydrochloric acid or sulfuric acid; acid anhydrides, such as maleic anhydride; aromatic acids, such as picric acid or benzene surfonic acid or sulfanilic acid; and polynuclear aromatic acids or acid salts, such as alpha naphthylamine sulfonic acid or sodium-1-naphthylamine - 3,6,8 - trisulfonate. Suitable alkaline catalysts which may be used include guanidine salts, such as guanidine carbonate and amino-guanidine bicarbonate; alkali metal hydroxides and carbonates, such as sodium hydroxide or sodium carbonate; aliphatic amines, such as ethyl amine and triethyl amine; aromatic amines such as aniline; aliphatic diamines, such as ethylene diamine; or a critical combination of a guanidine salt and an alkali metal hydroxide.

To insure that no plastic is left in the well bore and to increase the permeability of the unconsolidated sands, it is desirable to overflush the resin-treated formation with oil. The overflush liquid displaces the treating resin-forming liquid into the formation and also is itself displaced into the formation. When oil alone is used to displace the resin-forming liquid, the effectiveness of the consolidation treatment is reduced and the critical area directly adjacent the well bore remains unconsolidated because some components of the resin-forming mixture are soluble in oil. A high degree of consolidation around the well bore is necessary in order to prevent the well from producing sand. An improvement in the overflush procedure was developed and is disclosed and claimed in U.S. patent application Ser. No. 759,511, entitled "An Improved Method for Sand Consolidation," by W. O. Winsauer and J. H. Edwards, filed September 8, 1958, now U.S. Patent No. 3,022,825. In this technique a low molecular weight hydroxy aryl compound such as cresol, phenol, or cresylic acid is added to the overflush oil. Addition of this compound to the oil prevents extraction of the oil-soluble components of the resin mixture and allows the formation sands immediately adjacent the well bore to consolidate. Additionally, it permits the total volume of the formation treated to have a greater strength than otherwise could be obtained. The displacing oil may be crude oil, diesel oil, or any other petroleum fraction.

Although successful consolidation of many reservoir sands has been achieved through such treatments, many failures also have occurred. One reason for the failures apparently is that these type consolidations impart only moderate strength to the treated sand, and when the wells are placed on production following the resin treatment, oftentimes the sands are not consolidated strongly enough to withstand the differential pressure due to flow, and they move into the well bore.

One improvement afforded by the present invention resides in increasing very greatly the strength which is imparted to reservoir sands when treated with organic sand consolidation resins such as the phenol-formaldehyde type resins by incorporating in the consolidation treatment a step which promotes bonding between the inorganic sand and the organic resin. More particularly, prior to injecting the resin solution into the sands, an aqueous solution containing a chemical agent which functions to strengthen the bond between the sand and the subsequently injected resin is introduced into the formation being treated.

The chemical agents used for this purpose are amino-functional organo silane compounds, typical examples of which are 2,aminoethyl-aminopropyl-trimethoxy silane;
2,aminoethyl-aminopropyl-tripropylene oxide silane;
2,aminoethyl-aminopropyl-triethylene oxide silane;
2,aminomethyl-aminopropyl-trimethoxy silane;
2,amino-propyl-aminopropyl-trimethoxy silane;
1,trimethoxy-2,aminoethyl-2,aminopropyl disilane;
1,triethyleneoxide-2,aminoethyl-2,aminopropyl disilane;
1,tripropylene oxide 2,aminoethyl-2,aminopropyl disilane;
1,trimethoxy-2,aminomethyl-2,aminopropyl disilane;
1,trimethoxy-2,aminopropyl-2,aminopropyl disilane;
and 1,trimethoxy-2,aminoethyl-2,aminoethyl disilane.

The preferred agent is the compound 2,aminoethyl-aminopropyl-trimethoxy silane, which is a product manufactured and marketed by the Dow-Corning Corporation, Midland, Michigan, under the trade name Z-6020.

When the silane and resin solution are applied to the formation sands, the compressive strength of the sands is greatly increased, as will be shown, through the firm bond created between the resin and the sand particles by the silane treatment.

The following experimental data show the marked increase in the strength of sand consolidation which occurs when chemical bonding through use of the silane is obtained instead of the adhesive type bonding developed when sand is treated with the resin alone.

Silica sand was packed in a plastic tube. The sand was saturated with salt water and flooded with oil to simulate an oil-reservoir sand. Then a solution consisting of water containing 5 weight percent sodium chloride and 1 volume percent of an aminofunctional organo silane (Z–6020) was flowed through the sand. A reactive resin solution consisting of 100 ml. of formalin (37.5 weight percent formaldehyde, 13.5 percent methyl alcohol), 20 ml. meta-para cresol (3° F. boiling range), 18 gm. guanidine carbonate, and 2.24 gm. sodium hydroxide then was flowed into the sand. One to 10 percent by weight of 1,3,5-xylenol was added to provide for the specific formation temperatures. A second plastic tube was packed with sand and treated in the same manner as the first one, except that the salt water flowed into the sand immediately prior to introduction of the resin solution contained no Z–6020. Each of the sand-packed tubes was placed in a thermostatted bath at 110° F. to cure the resin. Compressive strengths of the treated sands then were measured. The compressive strength of the first sand which had received the Z–6020 silane preflush was 920 p.s.i., and the compressive strength of the sand which was not treated with the silane was only 370 p.s.i.

The results of similar tests are shown in the following Table I and represent a large number of sands consolidated and tested.

TABLE I.—TYPICAL DATA FOR SANDS CONSOLIDATED WITH BASE-CATALYZED RESIN

| Sand | Afterflush, Pore Volumes | Cure Time, Hours | Compressive Strength, p.s.i. | Permeability to Oil, Darcies | |
|---|---|---|---|---|---|
| | | | | Before | After |
| 80–120 mesh | 0 | 19 | 1,830 | 4.6 | 2.4 |
| 80–120 mesh | 1.5 | 19 | 1,220 | | |
| 80–120 mesh | 11 | 19 | 830 | 5.0 | 2.5 |
| Miocene | 3 | 22 | 1,315 | | 2.5 |

NOTE: Cure temperature—120° F. Preflush—1 percent silane in salt water.

Injection of the resin solution in each test was preceded by a preflush of 1 volume percent silane (Z–6020) and salt water, and following injection of the resin solution, 1 or more pore volumes of afterflush or overflush (2.4 percent by volume meta-para cresol in diesel fuel) was flowed through the tubes to simulate the procedure used in field wells to clean excess plastic from the casing or tubing. The sand-packed tubes were removed from the bath after various lengths of time, and the permeabilities and compressive strengths of the hardened sand were measured.

The effectiveness of the silane preflush also has been demonstrated in a number of actual wells. For example, seven wells treated with the best available consolidation process produced sand after treatment. However, five wells completed in the same formations as the others, but pretreated with an aqueous solution of an aminofunctional organo silane prior to injection of the consolidation chemicals, produced sand-free fluids after treatment.

The following Table II summarizes results from field applications of the above-noted preflush and overflush treatments.

TABLE II.—RESULTS FROM FIELD APPLICATIONS OF BASE-CATALYZED PLASTIC

| Location of Formation | Perforated Interval, Feet | Formation Temperature, ° F. | Results |
|---|---|---|---|
| Texas Gulf Coast | 5 | 110 | Producing 35 bbl./day oil, sand free. |
| Do | 14 | 104 | Producing 54 bbl./day oil, sand free. |
| Do | 9 | 115 | Gas lifting 112 bbl./day oil and water, sand free. |
| Offshore | 3 | 157 | Producing 177 bbl./day, sand free. |
| Do | 3 | 127 | Producing 200 bbl./day, sand free. |
| Do | 4 | 129 | Producing, sand free. |
| West Texas | | 140 | Pumping 40 bbl./day oil, sand free. |

The amount of resin solution used in the treatment of these wells ranged from 7 to 15 barrels or about ½ to 2 barrels per foot of perforated interval. The minimum practicable quantity for preparation under field conditions and injection into a well without undue contamination is about 4 barrels. The amount of preflush used ranged from 5 to 10 barrels or about ⅔ the volume of resin solution. Enough overflush is injected to assure that all resin solution has been cleared from the well bore and to leave the perforations covered with afterflush. Normally displacements are calculated to put 4 barrels of afterflush solution into the formation.

The preflush is prepared by adding the silane chemical to clean salt water, using 1 gallon of chemical for each 2½ barrels of water to obtain a 1 percent by volume solution (laboratory data indicate that a ½ percent solution is adequate, but the stronger solution has been used in most treatments to date). The salt water employed is preferably clean, fresh water to which has been added 20 pounds of sodium chloride per barrel.

The resin solution is prepared in steps. First, the formalin is mixed with the phenol component (meta-para cresol and xylenol, meta-para cresol only, or phenol only depending on the formation temperature). This solution then is cooled to about 30° F. by the addition of Dry Ice. When the catalysts are added, polymerization begins, and the reaction is exothermic; precooling the chemicals eliminates any risk of a flash set caused by an excessive temperature rise of the resin solution. When the formalin-phenol mixture has been cooled to the desired level, the guanidine carbonate is added and dissolved. The sodium hydroxide is added, and the solution is stirred for 5 minutes. Then it is ready for use.

The afterflush is prepared from diesel fuel to which is added 1 gallon of meta-para cresol per barrel of oil. Moderate stirring produces a uniform solution.

The well is prepared for treatment by filling it with crude oil or diesel fuel. If the volume of the rathole below the perforations is large, or if the rathole is required to be clear following the consolidation treatment, it should be filled with a clear fluid weighing 9.5 to 10 pounds per gallon before the well is filled with oil. A fluid of this density is slightly heavier than the plastic and will prevent settling of plastic into the rathole.

The injection of fluids into the well tubing then is begun. Fluids are pumped in the following sequence: (1) at least 2 barrels of clean salt water to separate the oil in the tubing from the preflush solution; (2) the preflush solution; (3) 2 barrels of salt water to separate the preflush from the following resin solution; (4) the resin solution; (5) the afterflush solution. The casing valve should be closed when the chemicals are still several barrels above the bottom of the tubing and should be kept closed thereafter. Squeezing is continued until 4 barrels of afterflush have entered the formation. Care should be taken to keep the injection pressure below the level at which formation fracturing might occur. Following the injection of the chemicals, the well is closed in for about 24 hours in the formation temperature exceeds 120° F. A longer shut-in period is desirable for temperatures lower than 120° F. After the resin has had time to cure, wells can be placed on production in any conventional manner, i.e., swab, gas-lift, etc.

Many wells have been treated according to this procedure. While many of the intervals treated were new completions, a number were old and had sanded up one or more times. Even more significantly, a number of the test wells were completed in formations where previous sand consolidation techniques had given poor results. The chemicals used for each well were proportioned to provide a plastic which would separate in a short time after placement at well temperature.

The rather wide range of field conditions encountered is summarized as follows.

*Range of conditions in field test wells*

Depth _____ft__ 1790 to 8496
Temperature _____° F__ 100 to 204
Length of interval _____ft__ 2 to 24
Number of perforations _____ 4 to 108

Additional experiments were performed to determine the relation of catalyst proportions to consolidation strength. In these experiments, 80–120 mesh sand was packed into 1-inch I.D. plastic tubes, saturated with salt water, and flooded with oil. The tubes were flushed with resin solutions having guanidine carbonate to sodium hydroxide weight ratios ranging from 10:1 to 3:1. The quantity of sodium hydroxide varied from 1 to 3 percent by weight of the cresol and formalin mixture. All the solutions contained five volumes of formalin to one volume of meta-para cresol. After the resin solution was injected, each sand-pack was flushed with 1.5 pore volumes of diesel fuel containing 2.4 volume percent meta-para cresol. The packs were then placed in a 140° F. water bath for 40 hours to assure complete curing of the resin. The consolidated sand was flushed with salt water and oil. 1½ inch long by 1-inch O.D. samples were cut from each sand pack and observations of compressive strength were made.

Averaged data on the compressive strengths of the consolidated, 80–120 mesh sand resulting from these experiments is shown in the following Table III.

TABLE III.—RELATION BETWEEN CATALYST PROPORTIONS AND THE COMPRESSIVE STRENGTH OF PLASTIC CONSOLIDATED SAND

| Test | Guanidine Carbonate-Sodium Hydroxide Ratio | Compressive Strength, p.s.i. |
| --- | --- | --- |
| a | 3 | 100 |
| b | 4 | 150 |
| c | 6 | 260 |
| d | 7 | 310 |
| e | 8 | 340 |
| f | 10 | 320 |
| g | 11 | 270 |

It is noted that when the guanidine carbonate-sodium hydroxide ratio was near 3:1, the compressive strength attained was only 100 p.s.i.; while at ratios of 8:1 or more, the compressive strength exceeded 300 p.s.i. A preferred ratio range is about 7:1 to 10:1. Adhesion was not affected by variations in the ratio of formalin to cresol, nor by the methanol content of the formalin.

Having fully described the method, objects, and advantages of my invention, I claim:

1. In a method for consolidating the sands of an incompetent subsurface petroleum-bearing formation in which a mixture of resin-forming liquids comprising a low molecular weight hydroxy aryl compound, a water-soluble aldehyde and a catalyst is introduced into said formation, said liquids reacting and setting in said formation and binding the sand particles thereof together, the improvement comprising: introducing into said formation a preflush water solution containing an amino-functional organo silane preceding introduction of said resin-forming liquids.

2. A method as recited in claim 1 in which said preflush solution consists of 5% by wt. sodium chloride and 1% by vol. silane in water.

3. A method as recited in claim 2 in which said silane compound is 2,aminoethyl-aminopropyl-trimethoxy silane.

4. A method as recited in claim 2 in which said silane compound is 1,trimethoxy - 2,aminoethyl - 2,aminopropyl disilane.

5. A method as recited in claim 2 including employing an acidic catalyst as said catalyst.

6. A method as recited in claim 2 including employing an alkaline catalyst as said catalyst.

7. A method as recited in claim 2 including employing employing guanidine carbonate and sodium hydroxide as the catalyst in a weight ratio ranging from about 7:1 to 10:1.

8. In a method for consolidating the sands of an incompetent subsurface petroleum-bearing formation in which a mixture of resin-forming liquids comprising a low molecular weight hydroxy aryl compound, a water-soluble aldehyde, and a catalyst is introduced into said formation, said liquids reacting and setting in said formation and binding the sand particles thereof together, and in which the formation is overflushed by introducing oil containing a low molecular weight hydroxy aryl compound into the formation following introduction into the formation of the resin-forming liquids and prior to the reaction and setting of the resin-forming liquids, said hydroxy aryl compound in the oil being in an amount sufficient to prevent extraction of the hydroxy aryl compound from the resin-forming mixture by the overflush oil, the improvement comprising: introducing into said formation a preflush water solution containing an aminofunctional organo silane preceding introduction into said formation of said resin-forming liquids.

9. A method as recited in claim 8 in which said preflush solution consists of 5% by wt. sodium chloride and 1% by vol. silane in water.

10. A method as recited in claim 9 in which said silane compound is 2,aminoethyl-aminopropyl-trimethoxy silane.

11. A method as recited in claim 9 in which said silane compound is 1,trimethoxy - 2,aminoethyl - 2,aminopropyl disilane.

12. A method as recited in claim 9 including employing an acidic catalyst as said catalyst.

13. A method as recited in claim 9 including employing an alkaline catalyst as said catalyst.

14. A method as recited in claim 9 including employing guanidine carbonate and sodium hydroxide as the catalyst in a weight ratio ranging from about 7:1 to 10:1.

15. A method as recited in claim 1 in which said resin-forming liquids comprise formaldehyde, cresol, xylenol and guanidine carbonate.

(References on following page)

References Cited by the Examiner

UNITED STATES PATENTS

| | | | |
|---|---|---|---|
| 2,259,875 | 10/1941 | Bent et al. | 166—32 X |
| 2,378,817 | 6/1945 | Wrightsman et al. | 166—33 |
| 2,633,919 | 4/1953 | Bauer et al. | 166—42 X |
| 3,047,067 | 7/1962 | Williams et al. | 166—33 |
| 3,052,583 | 9/1962 | Carlstrom et al. | 260—38 X |

OTHER REFERENCES

CHARLES E. O'CONNELL, *Primary Examiner.*

T. A. ZALENSKI, S. J. NOVOSAD, *Assistant Examiners.*